United States Patent
Correia et al.

(10) Patent No.: US 6,410,885 B1
(45) Date of Patent: Jun. 25, 2002

(54) MIG BRAZING POWER SOURCE

(75) Inventors: João Vinicius De Oliveira Correia, Icaraí-Niterói-RJ; William De Abreu Macedo, Rio de Janeiro, both of (BR); Giancarlo Riccardo Cavalli, Calolziocorte (IT)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/848,145

(22) Filed: May 3, 2001

(51) Int. Cl.[7] .................................................. B23K 9/09
(52) U.S. Cl. .................................................. 219/137 PS
(58) Field of Search ................................. 323/355, 362, 323/363; 219/136, 137 PS, 137 WM

(56) References Cited

U.S. PATENT DOCUMENTS

| | | | |
|---|---|---|---|
| 5,210,388 A | * 5/1993 | Farwer | 219/74 |
| 5,611,950 A | 3/1997 | Tochino et al. | 219/130.1 |
| 6,111,218 A | * 8/2000 | Matile et al. | 219/137 PS |

FOREIGN PATENT DOCUMENTS

| | | |
|---|---|---|
| EP | WO024544 A1 | 10/1999 |
| JP | 167659 A2 | 12/1998 |

OTHER PUBLICATIONS

Hackl "MIG Brazing of Galvanised Light–Gauge Sheets", Welding Review International, Nov. 1966.

Hughes et al., "Plasma Braze Welding in Autobody Production at Jaguar Cars", Welding & Metal Fabrication, Mar. 1995, pp. 110–111.

Dilthey et al., "GMA–Brazing of Galvanized and Alloyed Steels. An alternative Joining Technology in Vehicle Construction", IIW—Doc XII–1630–00, Sep. 2000.

* cited by examiner

Primary Examiner—Matthew Nguyen
(74) Attorney, Agent, or Firm—Bernard Lau

(57) ABSTRACT

This invention is directed to a MIG brazing power source having a transformer and an inductor. Each of the transformer and inductor has a magnetic core and a coil having specific characteristics.

14 Claims, 4 Drawing Sheets

MIG BRAZING POWER SOURCE

FIELD OF THE INVENTION

This invention is related to an electrical power source. More specifically, this invention is related to a metal inert gas (MIG) brazing power source with unique transformer and inductor designs.

BACKGROUND OF THE INVENTION

Zinc coated steel has been used extensively in welding because of their resistance to corrosion damage. However, joining galvanized sheet steels faces a basic problem in that they produce zinc vapor when heated at high temperatures. Zinc starts to melt at a temperature around 420° C. and vaporize at around 907° C. These properties have an unfavorable effect on the arc welding operation because as soon as the electric arc is generated, zinc vapors are formed, causing arc instability, and leading to other problems such as porosity and excessive spattering. The heat generated by the high temperatures causes burn-through and destruction of the zinc coating, thus decreasing the corrosion resistance. Because of these problems, it is necessary to reduce the heat generated in the arc column during the welding of galvanized steel sheets. In order to obtain such results, it is necessary not only to combine appropriate wires and shielding gases, but also to use welding power sources with very particular characteristics.

The problems caused by heat have limited the use of Gas Metal Arc Welding (GMAW) process to join these materials and determining the adoption of MIG brazing as an alternative joining process to be used for galvanized sheet steels.

In terms of equipment, MIG brazing appears to be similar to GMAW, although it is based on a totally different concept. While GMAW aims to produce a welded joint composed by the fusion of base and filler metals, MIG brazing joins the materials by wetting and capillary action, without melting the base material. The use of lower melting point filler metal, as in MIG brazing, requires lower heat input, and consequently, reduces the zinc coating damage. However, to achieve this benefit, optimized metal transfer conditions have to be selected in order to avoid spattering and coating burn-off. The equipment characteristics have an important role to play in controlling metal transfer. Consequently, the power source to perform MIG brazing has different requirements regarding heat distribution and arc characteristics. Then, it would be expected that MIG brazing power sources were customized to this operation, instead of using the same equipment used for GMAW.

There exists some electronic equipment having characteristics required by MIG brazing of plate thickness higher than 0.8 mm. Nevertheless, they are very complex to control process parameters, very expensive and of high maintenance cost. On the other hand, the existing electromagnetic equipment does not have suitable output characteristics for MIG brazing operation. These restrictions have limited the use of MIG brazing of galvanized steel to less complex applications and for few materials/coating thickness. At present, there are three commercial available options for MIG brazing equipment. The first one uses the same electromagnetic power source as conventional GMAW that is unsuitable, as described above. The second and third options rely on very sophisticated electronic power sources, pulsed or not, which are much more expensive and hard to select optimized parameters set. The pulsed power sources have an additional difficulty in that the zinc layers are greater than 20 mm and the plate thickness are lower than 0.8 mm. Even with these limitations, the current application for MIG brazing to join galvanized steel sheet is predominantly with the electronic power sources, using pulsed arc. This option is suitable for automatic processes, which can justify high investment in this kind of power sources and can operate at high travel speeds that are demanded by pulsed spray arc brazing of thin plates. However, the use of electronic power sources, especially in a pulsed arc mode, has not satisfied the demands for MIG brazing of galvanized sheet steels.

The high cost of electronic equipment and their difficulty in joining thinner plates and/or thicker coating layers have led many users to try use the electromagnetic power sources as an option to perform MIG brazing.

U.S. Pat. No. 5,611,950 discloses some design changes in an electromagnetic welding power source in order to supply a stable welding current having a smooth waveform and enough short circuit current. The approach used in this patent includes the connection in parallel of extra rectifiers and capacitors with the rectifying circuit in order to minimize the ripple of the current and voltage waveforms. This approach, besides substantially increasing the manufacturing cost, does not provide the desirable results in terms of arc stability and outputs characteristics that are reqired by the MIG brazing process.

It is therefore an objective of this invention to develop a conventional dedicated power source for MIG brazing, especially for galvanized sheet steels, but not limited to these materials, with the individual advantages of electronic power sources, i.e., good arc stability and low spattering level, and of electromagnetic power sources, i.e., easy parameters adjustment and low investments and maintenance costs.

It is another objective of this invention to develop a conventional dedicated power source for MIG brazing with no limitations regarding minimum plate thickness and also regarding maximum coating layer thickness as observed in electronic pulsed and existing electromagnetic power sources.

It is an additional objective of the invention to develop a conventional dedicated power source to be used in MIG brazing that is less expensive, easier to control process parameters, with lower maintenance cost and allowing excellent brazed joint quality.

SUMMARY OF THE INVENTION

One aspect of this invention is directed to a power source for MIG brazing that comprises a concentric type transformer having a specific magnetic core and certain coils having specific characteristics, as well as an inductor having a magnetic core with specific characteristics and certain coils having specific characteristics.

Another aspect of this invention is directed to a power source for MIG brazing that comprises a concentric type transformer that has a specific magnetic core and specific coils.

Yet another aspect of this invention is directed to a power source for MIG brazing that comprises an inductor that has a specific magnetic core and specific coils.

DETAILED DESCRIPTION OF THE INVENTION

Figure 1A:
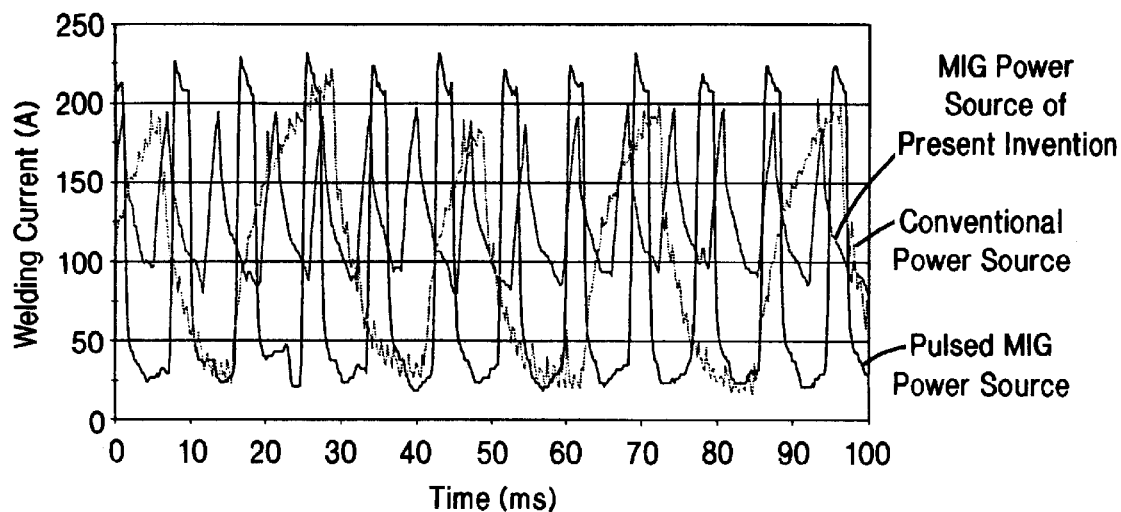
FIG. 1a is an oscilogram of the welding current against time for the conventional MIG power source, the pulse MIG power source and the MIG power source of the present invention.

MIG brazing is an arc welding process performed with a gas shielded, low melting point, continuously fed and consumable wire electrode. The filler metal is generally a copper alloy comprising silicone with from about 3% or 8% of aluminum, which has a melting range between about 900° C. and 1100° C. Due to the low energy necessary to melt the filler metal, base metal fusion may be reduced or completely eliminated, similarly to a conventional brazed joint. However, the bonding mechanism MIG brazing is substantially different from conventional brazing. While the former has wetting effect as its main bonding mechanism, the latter is promoted by capillary action. Then, the joint configuration for MIG brazing has larger gaps than conventional brazing. Some of the advantages that may result from the use of MIG brazing are: a) low heat input that represents lower distortion and smaller heat affected zone when compared with arc welding and conventional brazing; b) no corrosion of the weld seam; c) cathodic protection of the base metal in the immediate vicinity of the seam; d) low coating burn-off when joining coated steels; and e) high travel speed and possibility for automation.

The most common application of MIG brazing process is to join galvanized steel sheets. The process characteristics assure minimal damage to the zinc layer, keeping its high corrosion resistance. Generally, the recommended shielding gas is argon. However, some trials have shown that small additions of oxygen or carbon dioxide to argon can improve arc stability and reduce the spattering level. Spattering is one of the problems that have to be avoided, because it may cause coating damage. Another problem is that the zinc layer may burn off from the heat developed during the brazing operation.

The state of the art recommends the use of equipment that are very similar to GMAW, but the required heat input is about half that of the GMAW. Conventional short circuit and pulsed arc power sources may be used to transfer material from the filler metal towards the joint. Short circuit is easier to adjust, but with conventional equipment, micro spatters are produced by strong weld pool dynamics and the resulting irregular droplet detachment cannot be avoided. In general, short circuit enables less energy input into the work piece as compared to pulsed spray arc.

Pulsed arc requires a background current of from about 40 or about 50 amperes to keep the arc opened. This level of background current is very high when compared to mean current, which is about 52 or about 55 amperes, as is usually required for thin sheet (lower than about 0.8 mm). Generally, thicker zinc layers (greater than 15 mm) generate larger amounts of zinc vapor, leading to unstable arc. For this reason, pulsed spray arc, with a very short arc length, was often recommended for these applications. The short arc length was chosen to keep a steadier arc. Controlled metal transfer can be achieved by selecting suitable parameters for the background and peak currents. This is achieved by having one droplet of filler metal per pulse for detaching the wire electrode. This results in a spatter-free process.

The present MIG brazing power source consists of a MIG-MAG, step adjusted direct current power source with a built-in wire feeder that can deliver a particularly stable arc in a low power range, within which the brazing is performed. The power source, for keeping a short arc length, must be capable of providing a low background current amperage in order to have a rapid reaction versus arc length variations. A new aspect of this power source stems from an ability to control in a stable way the welding current value, the short circuit current value, their wave forms and their reproducibility in time (droplet frequency), and not through expensive and sophisticated electronic controls, but to its particular geometric construction and by using special material inside its own transformer and relative reactor.

The result is low heat input in the base metal and reduced zinc vaporization. This, in turn, has a positive impact on both after-weld machining (grinding) of the seam and enhancing the strength value of the brazed joint. The most important constructive parts to achieve were the transformer and the inductor. They were built to promote the control on current waveforms within limits designed to allow high performance during MIG brazing.

In the present MIG brazing power source, the lower cost and easier parameters setting were achieved by using the electromagnetic approach rather than the electronic one. The better performance of this new power source on galvanized steels was achieved through an optimized design of its output electric characteristics. These welding power sources must operate so that the filler metal is transferred to the base metal in a controlled way and therefore must be able to supply the short circuit current and the welding current to the physical characteristics of the electric arc during the different welding situations.

In short-circuit transfer, metal is transferred from the electrode to the workpiece only during a period when the electrode is in contact with the weld pool. No metal is transferred across the arc gap. The electrode contacts the molten weld pool in a range of about 20 to over about 200 times per second. Spattering is promoted when the rate of current increases very quickly and causes violent separation of the metal droplet. This rate of current is controlled by adjustment of the inductance in the power source. The optimum inductance setting depends on both the electrical resistance of the welding circuit and the melting temperature of the electrode. When the arc is established, the wire melts at the tip as the wire is fed forward in the direction of the next short circuit. The open circuit voltage of the power source must be so low that the droplet of molten metal at the wire tip cannot transfer until it touches the base metal. The energy for arc maintenance is partly provided by energy stored in the inductor during the period of short circuiting.

The static volt-ampere characteristic of a constant potential power source has a slope ($\Delta V/\Delta I$) which has a major function in short-circuiting transfer mode, since it controls the magnitude of the short-circuit current (amperage that flows when the electrode is shorted to the work piece). The separation of molten metal droplets from the electrode is controlled by an electrical phenomenon called the electromagnetic pinch effect. Pinch is the magnetic "squeezing"

force on a conductor produced by the current flowing through it. The pinch effect is proportional to short-circuit current (determined by the slope of volt-ampere curve of the power source).

In short circuit transfer, the amount of short circuit current is important since the resultant pinch effect determines the way by which a molten droplet detaches from the electrode. This in turn affects the arc stability. When little or no slope on the volt-ampere curve is present in the power supply circuit, the short circuit current will rise rapidly to a high level. The present invention provides a power source capable of having a volt-ampere curve of about zero. The pinch effect will also be high, and the molten droplet will separate violently from the wire. The excessive pinch effect will abruptly squeeze the metal aside, clear the short circuit, and create excessive spatter.

When the short circuit current is limited to a low value by a steep slope, the electrode will carry the full current, but the pinch effect may be too low to separate the droplet and re-establish the arc. Under these conditions, the electrode will either pile up on the workpiece or freeze to the puddle. When the short circuit current is at an acceptable value, the parting of the molten droplet from the electrode is smooth with very little spatter.

The instantaneous pinch effect is controlled by the instantaneous current, and therefore the shape of the current time curve is significant. The inductance in the circuit controls the rate of current rise. Without inductance, the pinch effect is applied rapidly and the molten droplet will be violently squeezed off the electrode and cause excessive spatter. Higher inductance results in a decrease in the short circuits per second and in an increase in the arc-on time. Increased arc-on time makes the puddle more fluid and results in a flatter, smoother weld bead.

Figure 1B:
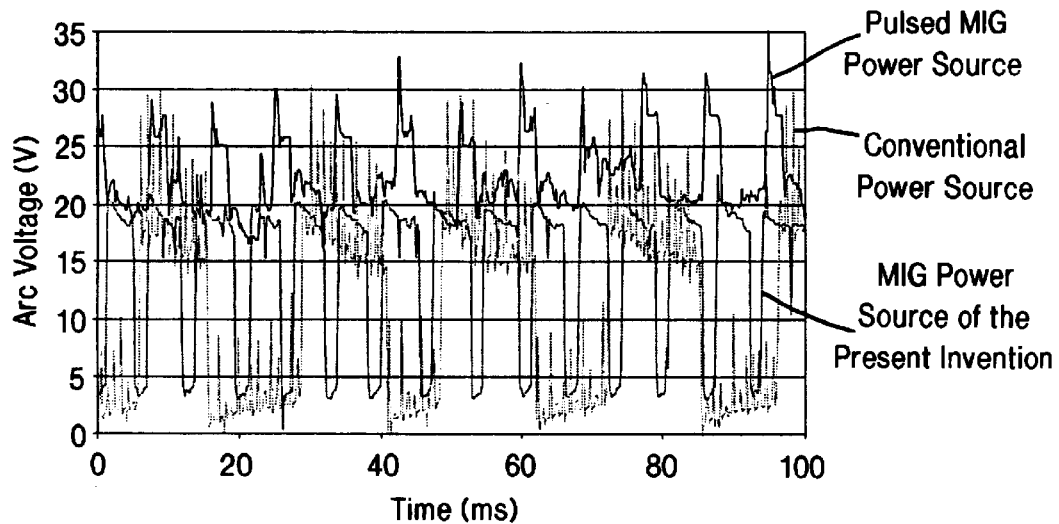
FIG. 1b is an oscilogram of the arc voltage against time for the conventional MIG power source, the pulse MIG power source and the MIG power source of the present invention.

According to these concepts, the present invention was developed to determine the electric output characteristics of the power source when performing MIG brazing seams with very stable arc and low spattering level. This investigation leading to the present invention included conventional and pulsed power sources. The oscillograms of current and voltage were compared to determine the ideal energy and voltage levels, in addition to other requirements, to get high arc stability during short-circuiting transfer. FIG. 1 shows a conventional and a pulsed power source's oscillogram from this study.

Figure 2A:
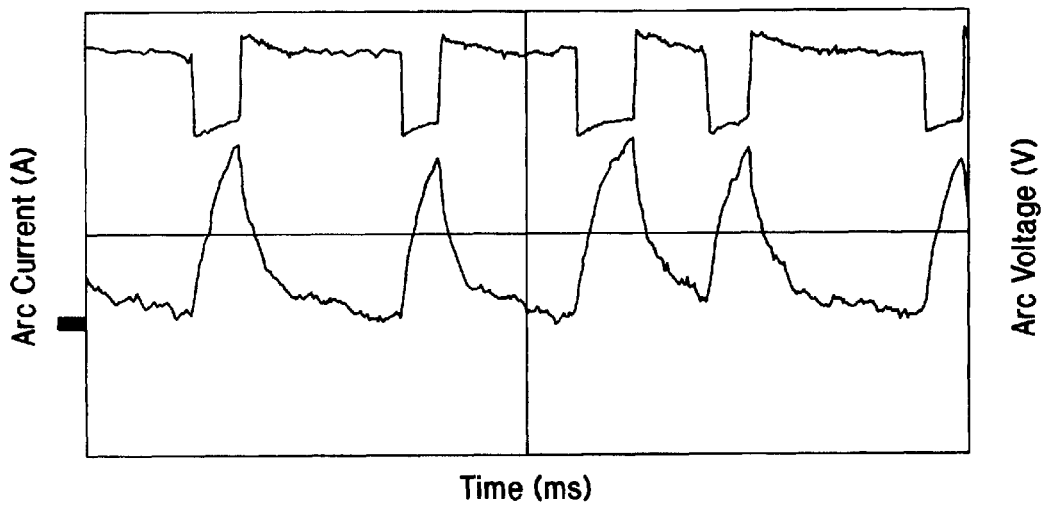
FIG. 2a is an oscilogram of the welding current showing the metal transfer control through the short circuit of the present invention.
Figure 2B:
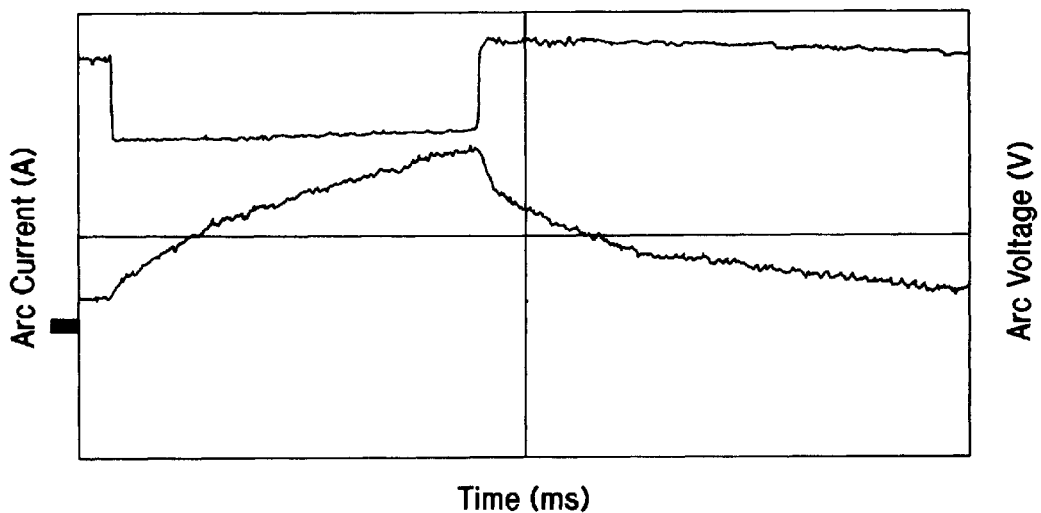
FIG. 2b is an oscilogram of the arc voltage showing the metal transfer control through the short circuit of the present invention.

FIG. 2 shows how the welding machine controls the current rise and the current fall when molten filler wire droplet detaches (higher value) and its capability to keep a stable and constant welding current value during the free arc time (lower value). The current rise must be rapid without promoting spattering; therefore the welding machine must operate so that the droplet can detach softly from the filler wire, to avoid projections and overheating.

On the other hand, the current fall should be slow and gradual, in order to create a free arc as stable as possible before the next droplet detaches, to avoid porosity and zinc vaporization. The power source should be also able to deposit an adequate droplets number on the base metal: a) about 120 droplets/sec on 1.5 mm thickness; b) about 90 droplets/sec on 1.0 mm thickness; c) about 45 droplets/sec on 0.8 mm thickness; and d) to keep them constant during all the welding time.

The power source of this invention was designed to satisfy these requirements through the development of a specially designed transformer, having an internal reactance and resistance, as well as a specially designed inductor (schematic diagrams 1 and 2). Each of the transformer and inductor provides certain unique characteristics to the present power source. Their combination provides a fast dynamic characteristic and a constant voltage static characteristic with a slight voltage/amperage slope.

One embodiment of the transformer is of a simple concentric type, i.e. the secondary is wound over the primary. It has the following characteristics: a) magnetic core (preferably iron core): silicon content from about 0.95% to about 1.2% in weight; total thickness from about 43 to about 47 mm; b) coils: width from about 97 to about 103 mm in diameter; length from about 115 to about 125 mm; minimum number of primary turns from about 310 to about 330; maximum number of primary turns from about 610 to about 670; number of secondary turns from about 18 to about 22; primary winding thickness from about 13 to about 16 mm; secondary winding thickness from 0.65 to about 0.75 mm; primary inductance (secondary on short circuit) with minimum from about 3.5 to about 4 mH and maximum from about 10 to about 11 mH; primary inductance (secondary open) with minimum from about 90 to about 100 mH and maximum from about 370 to about 395 mH; primary resistance from about 1.1 to about 2.9 Ohm, at 18° C.; secondary inductance (primary open) from about 360 to about 380 mH; and secondary resistance from about 9.2 to about 9.8 mohm, at 18° C. This winding system provides a low inductance leakage. The core drawing is "E" shaped with a short leg of 125 mm length and an "I" MIG-MAG externally welded over it. All the assembly is then MIG-MAG welded. The coils are wound on a spool. This spool, molded with high thermal resistance material (over 250° C.), has some grooves inside which are pressed in the core to avoid that the winding electrodynamics forces cause vibrations and noises. The inside edges are rounded to avoid wire stretching during the winding operation and both walls and structure are made in order to provide the insulation distance given by the standards actually in force.

In one embodiment, the primary winding, made of modified polyesteramide aluminum, is wound on the spool and taps are set at a certain winding number, in order to obtain welding current adjustments for each different welding lamination thickness. Over the primary are placed 3 nomex layers, which provide the insulation between primary and secondary winding, giving at the same time the transformer reactance leakage value. The secondary winding is wound over the nomex layer in one layer only. The coil is tied with insulation strips and one or more layers of varnishes known in the art dried at high temperature (180° C.).

The winding geometric configuration provides the required inductance, but it was also necessary to create an electric resistance in order to have a light voltage drop at current crossing. The resistance effect was given by the aluminum used in the winding. Aluminum has an electric resistivity higher than copper and is particularly suitable in this invention. On the other hand the coil is hotter and it is therefore necessary to use insulating materials with high thermal and mechanical characteristics. Also, the magnetic lamination sheet used for the transformer core has been replaced by a new magnetic lamination sheet with different properties.

Beside the transformer, a new smoothing inductor connected in series to the direct current output was also developed and manufactured. An embodiment of the inductor has the following characteristics: a) magnetic core (preferably iron core): chemical composition range, in weight: carbon from about 0.15% to about 0.20%, manganese from about 0.35% to about 0.70%, silicon from about 0.32% to about 0.38%; dimensions: diameter from about 45 to about 55 mm, length from about 155 to about 165 mm; b) coils: width from about 73 to about 79 mm; length from about 145 to about 150 mm; number of turns (tap) from about 31 to about 34; number of turns (maximum) from about 37 to about 41; winding inductance (tap) from about 50 to about 60 mH; winding inductance (maximum) from about 72 to about 82 mH; winding resistance (tap) from about 6.8 to about 7.6 mOhm, at 18° C.; winding resistance(maximum) from about 8.2 to about 9.0 mOhm, at 18° C. The core being used is made of Fe36, which is a material with particular magnetic characteristics, and its shape and windings number allow to reach an inductance value proportional to the current value.

One embodiment of the inductor includes a Fe36 iron core with about 50 mm diameter and about 160 mm height. A 0.51 mm thickness nomex sheet is wound on the core and a 33+6 aluminum 2 nomex windings with about 5.8 mm diameter is wound over it. Such an inductor arrangement, when properly combined with the transformer, provides the current wave form required to produce the excellent welding result.

Figure 3:
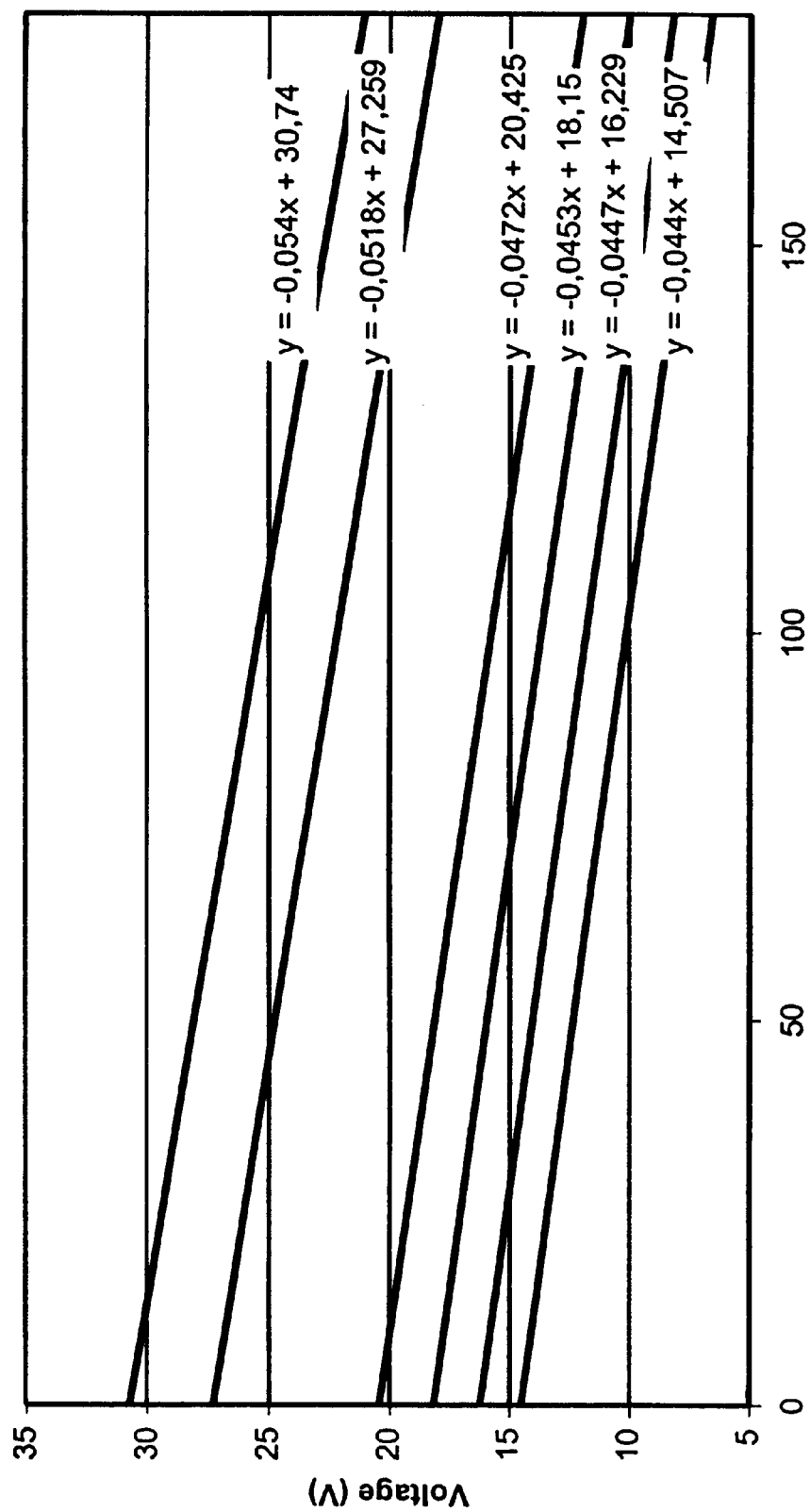
FIG. 3 is a graph showing the static arc voltage against the welding current of the present invention.
Figure 4A:
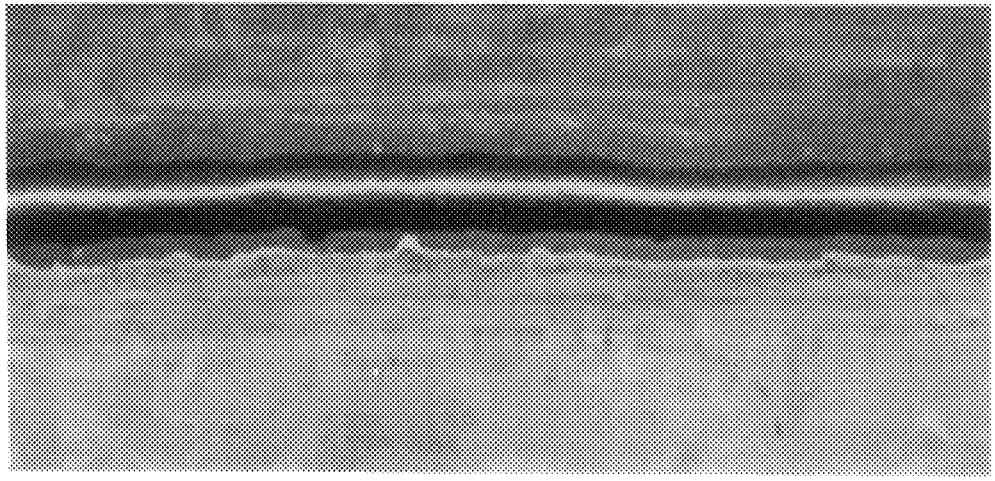
FIG. 4a is a macroscopic aspect of the MIG brazed bead performed with the pilot machine using argon as shielding gas in the present invention.
Figure 4B:
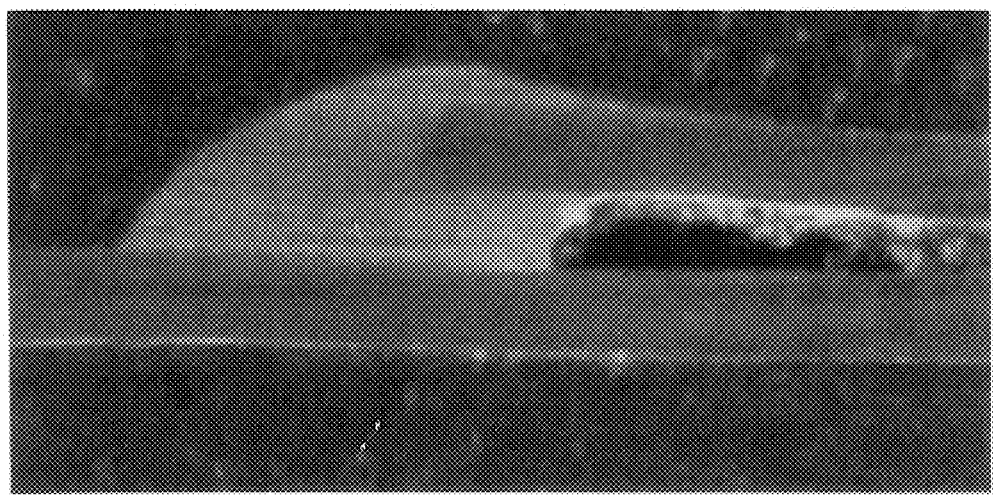
FIG. 4b is a macroscopic cross section of the MIG brazed bead performed with the pilot machine using argon as shielding gas in the present invention

The pilot machine built with these characteristics showed a very stable arc condition and excellent heat distribution, promoting very low damage to zinc layer and no spattering. FIG. 3 shows the equipment's static volt-ampere curve and FIG. 4 shows the macrography of this MIG brazed bead performed with the pilot machine using argon as shielding gas. The MIG brazing parameters used to test a range of plate thickness and zinc layers are shown in Table 1.

Table 1: MIG brazing parameters used to evaluate the power source, using 0.8 mm diameter filler metal with the following chemical composition: 97% Cu+0.2% Sn+0.2% Fe+0.8%Mn+1.3% Si.

| Shielding Gas (Flow Rate) | Plate Thickness (mm) | Brazing Current (A) | Arc Voltage (V) | Travel Speed (cm/min) |
|---|---|---|---|---|
| Argon (12 l/min) | 0.65 | 50 | 13.5 | 60.0 |
| | 0.95 | 60 | 16.5 | 42.0 |
| | 1.25 | 65 | 17.9 | 38.4 |
| | 1.5 | 110 | 14.5 | 60.0 |
| | 0.95 | 54 | 16.0 | 26.4 |
| | 1.25 | 70 | 17.5 | 27.2 |

The test results showed that the joints had excellent bead geometry, no fusion of base material, very low level of spattering and virtually no damage to the coating layer. According to the results, the determination of specific values of output electric characteristics (inductance and static volt-ampere characteristics) allowed the development of a conventional dedicated power source to perform MIG brazing, especially for galvanized sheet steels, with significant advantages as compared to the expensive and sophisticated electronic power sources. The power source developed showed high performance even when brazing galvanized sheet steels within a large range of plate/coating thickness with an superior arc stability, which promoted no spattering and an optimized heat distribution in the arc zone producing virtually no damage to the coating.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:
1. A power source for MIG brazing comprising
   a. a concentric type transformer comprising
      1) a magnetic core having silicon content from about 0.95% to about 1.2% in weight; and a total thickness from about 43 to about 47 mm;
      2) coils having width from about 97 to about 103 mm in diameter; length from about 115 to about 125 mm; number of primary turns from about 310 to about 670; number of secondary turns from about 18 to about 22; primary winding thickness from about 13 to about 16 mm; secondary winding thickness from about 0.65 to about 0.75 mm; primary inductance (secondary on short a circuit) from about 3.5 to about 11 mH; primary inductance (secondary open) from about 90 to about 395 mH; primary resistance from about 1.1 to about 2.9 Ohm, at 18° C.; secondary inductance (primary open) from about 360 to about 380 mH; and secondary resistance from about 9.2 to about 9.8 mOhm, at 18° C.; and
   b. an inductor comprising
      1) a magnetic core having carbon from about 0.15% to about 0.20%, manganese from about 0.35% to about 0.70%, and silicon from about 0.32% to about 0.38% all in weight; a diameter from about 45 mm to about 55 mm, and a length from about 155 to about 165 mm; and
      2) coils having width from about 73 to about 79 mm; length from about 145 to about 150 mm; number of turns from about 31 to about 41; winding inductance from about 50 to about 82 mH; winding resistance from about 6.8 to about 9.0 mOhm, at 18° C.

2. The power source of claim 1 wherein said transformer magnetic core is an iron core.

3. The power source of claim 1 wherein said inductor magnetic core is an iron core.

4. The power source of claim 1 wherein said inductor magnetic core is a Fe36 iron core with about 50 mm diameter and about 160 mm height.

5. The power source of claim 4 wherein a nomex sheet is wound around said core.

6. The power source of claim 1 wherein it is capable of providing a volt-ampere curve having a slope of about zero.

7. A power source for MIG brazing comprising a concentric type transformer, said transformer comprising
   a) a magnetic core having silicon content from about 0.95% to about 1.2% in weight; and a total thickness from about 43 to about 47 mm; and
   b) coils having width from about 97 to about 103 mm in diameter; length from about 115 to about 125 mm; minimum number of primary turns from about 310 to about 670; number of secondary turns from about 18 to about 22; primary winding thickness from about 13 to about 16 mm; secondary winding thickness from 0.65 to about 0.75 mm; primary inductance (secondary on short circuit) from about 3.5 to about 11 mH; primary inductance (secondary open) from about 90 to about 395 mH; primary resistance from about 1.1 to about 2.9 Ohm, at 18° C.; secondary inductance (primary open) from about 360 to about 380 mH; and secondary resistance from about 9.2 to about 9.8 mohm, at 18° C.

8. The power source of claim 7 wherein said transformer magnetic core is an iron core.

9. The power source of claim 7 wherein it is capable of providing a volt-ampere curve having a slope of about zero.

10. A power source for MIG brazing comprising a an inductor, said inductor comprising a) a magnetic core having carbon from about 0.15% to about 0.20%, manganese from about 0.35% to about 0.70%, and silicon from about 0.32% to about 0.38% all in weight; a diameter from about 45 to about 55 mm, and a length from about 155 to about 165 mm; and b) coils having width from about 73 to about 79 mm; length from about 145 to about 150 mm; number of turns from about 31 to about 41; winding inductance from about 50 to about 82 mH; winding resistance from about 6.8 to about 9.0 mOhm, at 18° C.

11. The power source of claim 10 wherein said inductor magnetic core is an iron core.

12. The power source of claim 10 wherein said inductor magnetic core is a Fe36 iron core with about 50 mm diameter and about 160 mm height.

13. The power source of claim 12 wherein a nomex sheet is wound around said core.

14. The power source of claim 10 capable of providing a volt-ampere curve having a slope of about zero.

* * * * *